United States Patent
McClure (10) Patent No.: US 11,684,015 B2
(45) Date of Patent: Jun. 27, 2023

(54) AGRICULTURAL BALING SYSTEM WITH CONTROLLED TRACTOR STEERING TO BALANCE BALE DENSITY

(71) Applicant: CNH Industrial America LLC, New Holland, PA (US)

(72) Inventor: John R. McClure, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 718 days.

(21) Appl. No.: 16/534,365

(22) Filed: Aug. 7, 2019

(65) Prior Publication Data

US 2021/0037713 A1    Feb. 11, 2021

(51) Int. Cl.
| | |
|---|---|
| *G06F 7/70* | (2006.01) |
| *G06F 19/00* | (2018.01) |
| *G06G 7/00* | (2006.01) |
| *G06G 7/76* | (2006.01) |
| *A01F 15/08* | (2006.01) |
| *A01F 15/07* | (2006.01) |
| *A01B 69/04* | (2006.01) |
| *B30B 9/30* | (2006.01) |

(52) U.S. Cl.
CPC ........ *A01F 15/0833* (2013.01); *A01B 69/008* (2013.01); *A01F 15/071* (2013.01); *B30B 9/3007* (2013.01); *A01F 2015/076* (2013.01)

(58) Field of Classification Search
CPC ................ A01F 15/0833; A01F 15/071; A01F 2015/076; A01B 69/008; B30B 9/3007
USPC ......................................................... 701/50
See application file for complete search history.

(56) References Cited

U.S. PATENT DOCUMENTS

| | | |
|---|---|---|
| 4,065,914 A | 1/1978 | Phillips et al. |
| 4,224,867 A | 9/1980 | Gaeddert et al. |
| 4,517,795 A | 5/1985 | Meiers |
| 4,651,512 A | 3/1987 | van der Lely |
| 4,686,820 A | 8/1987 | Andra et al. |
| 4,702,066 A | 10/1987 | Newendorp et al. |
| 4,748,801 A | 6/1988 | Sheehan et al. |
| 4,748,802 A | 6/1988 | Strosser et al. |

(Continued)

FOREIGN PATENT DOCUMENTS

| | | |
|---|---|---|
| CA | 1290187 C | 10/1991 |
| DE | 3811649 C1 | 6/1989 |

(Continued)

*Primary Examiner* — Mahmoud S Ismail
(74) *Attorney, Agent, or Firm* — Peter Zacharias (57) ABSTRACT

A method of controlling a travel path of an agricultural baling system including a baler and a tow vehicle includes: receiving a first bale density signal indicative of a first bale density of a forming bale at a first location in a baling chamber; receiving a second bale density signal indicative of a second bale density of the forming bale at a second location; receiving a windrow signal indicative of a width of a windrow; comparing the first bale density to the second bale density; determining a difference between the first bale density and the second bale density exceeds a threshold difference; and outputting a steering signal to a steering mechanism of the tow vehicle to adjust at least one steerable wheel of the tow vehicle by an adjustment when the determined difference exceeds the threshold difference, the adjustment being based at least partially on the received windrow signal.

16 Claims, 5 Drawing Sheets

(56) References Cited

U.S. PATENT DOCUMENTS

| | | | |
|---|---|---|---|
| 4,750,323 A | 6/1988 | Sheehan et al. | |
| 4,850,271 A | 7/1989 | White et al. | |
| 5,131,214 A | 7/1992 | Vermeer | |
| 5,226,356 A | 7/1993 | Schrag et al. | |
| 5,408,817 A | 4/1995 | Wagstaff | |
| 5,444,969 A | 8/1995 | Wagstaff et al. | |
| 5,605,095 A | 2/1997 | McClure | |
| 5,615,544 A | 4/1997 | Berger et al. | |
| H1819 H | 12/1999 | Anderson et al. | |
| 6,874,412 B1 | 4/2005 | Glaszcz et al. | |
| 7,913,482 B2 | 3/2011 | Olander et al. | |
| 7,918,158 B2 | 4/2011 | Viaud | |
| 8,234,033 B2 | 7/2012 | Brubaker et al. | |
| 8,571,744 B2 | 10/2013 | Brubaker et al. | |
| 9,560,808 B2 | 2/2017 | Foster et al. | |
| 9,706,697 B2 | 7/2017 | Wilkening et al. | |
| 9,913,432 B2 | 3/2018 | Schrag et al. | |
| 2013/0312381 A1 | 11/2013 | Lang | |
| 2014/0090568 A1 | 4/2014 | Missotten et al. | |
| 2015/0272006 A1 | 10/2015 | Demon | |
| 2016/0270296 A1* | 9/2016 | Verhaeghe | G01P 3/00 |
| 2017/0131722 A1* | 5/2017 | Hiramatsu | G01S 13/931 |
| 2018/0325013 A1* | 11/2018 | Boydens | A01B 69/00 |
| 2019/0098835 A1* | 4/2019 | Kraus | A01F 15/07 |
| 2020/0077595 A1* | 3/2020 | Lang | A01F 15/0825 |

FOREIGN PATENT DOCUMENTS

| | | |
|---|---|---|
| EP | 060956 A1 | 9/1982 |
| EP | 257614 A1 | 3/1988 |
| EP | 282128 A1 | 9/1988 |
| EP | 296709 A1 | 12/1988 |
| EP | 137337 A1 | 7/1991 |
| EP | 287156 B1 | 6/1992 |
| EP | 1685759 A1 | 8/2006 |
| EP | 2027764 A1 | 2/2009 |
| EP | 1813146 B1 | 6/2009 |
| EP | 1926364 B1 | 1/2010 |
| EP | 1935233 B1 | 2/2010 |
| EP | 2509404 B1 | 3/2014 |
| EP | 2870857 B1 | 7/2014 |
| EP | 2267567 B1 | 8/2014 |
| EP | 3189722 A1 | 7/2017 |
| EP | 2656726 B1 | 11/2018 |
| WO | 2014076271 A1 | 5/2014 |

* cited by examiner

AGRICULTURAL BALING SYSTEM WITH CONTROLLED TRACTOR STEERING TO BALANCE BALE DENSITY

FIELD OF THE INVENTION

The present invention pertains to agricultural vehicles and, more specifically, to agricultural baling systems.

BACKGROUND OF THE INVENTION

Round balers have become quite prevalent for their capability of producing a conveniently sized cylindrical bale, very often automatically wrapped with a sheeting material such as net or film. Crop material, such as hay, is picked up from the ground as the baler travels across the field, and is fed into an expandable chamber where it is rolled up to form a compact cylindrical hay package.

Known round balers generally have an expandable bale chamber defined by a pair of fixed sidewalls, and a plurality of side-by-side belts cooperating with a series of transverse rolls, mounted between a pair of pivotally mounted arms commonly known as a sledge. The chamber includes an inlet opening in the front through which crop material is fed. Also included is a pair of take up arms pivotally mounted on the main frame, between which arms multiple of guide rolls are journalled. A biasing force is applied on the take up arms to urge the outer surfaces of the guide rolls against the belts to maintain belt tension and prevent slack from occurring in the belts during expansion and contraction of the chamber.

One or more potentiometers may be placed in the bale chamber to keep track of the density of the forming bale. In many instances, the windrow that is picked up by the baler to form the bale has a smaller width than the bale chamber. This difference in width results in uneven feeding of crop material to the bale and uneven density within the bale, which can create undesired shapes of the formed bale.

What is needed in the art is an agricultural baling system that can reliably balance the bale density in a forming bale to create bales with square corner shapes and uniform density throughout the bale.

SUMMARY OF THE INVENTION

Exemplary embodiments disclosed herein provide an agricultural baling system with a baler and a tractor with a windrow sensor, as well as a controller that can control a steering mechanism of the tractor based at least partially on a signal from the windrow sensor when bale densities at different locations of a forming bale differ by a threshold amount.

In some exemplary embodiments provided in accordance with the present disclosure, an agricultural baling system includes an agricultural baler including: a baler chassis; a pickup carried by the baler chassis and having a plurality of tines; a baling chamber carried by the baler chassis; a first sensor configured to output a first bale density signal indicative of a first bale density of a forming bale at a first location in the baling chamber; and a second sensor configured to output a second bale density signal indicative of a second bale density of the forming bale at a second location in the baling chamber. A tow vehicle is coupled to the agricultural baler. The tow vehicle includes: a vehicle chassis; a plurality of steerable wheels carried by the vehicle chassis; a steering mechanism coupled to the steerable wheels and configured to adjust at least one of the steerable wheels; a windrow sensor carried by the vehicle chassis and configured to output a windrow signal indicative of at least a width of a windrow in front of the tow vehicle; and a controller operably coupled to the first sensor, the second sensor, the steering mechanism, and the windrow sensor. The controller is configured to: receive the first bale density signal, the second bale density signal, and the windrow signal; compare the first bale density to the second bale density; determine a difference between the first bale density and the second bale density exceeds a threshold difference; and output a steering signal to the steering mechanism to adjust at least one of the steerable wheels by an adjustment when the determined difference exceeds the threshold difference, the adjustment being based at least partially on the received windrow signal.

In some exemplary embodiments, a method of controlling a travel path of an agricultural baling system including a baler and a tow vehicle towing the baler is provided. The method is performed by a controller and includes: receiving a first bale density signal from a first sensor of the baler, the first bale density signal being indicative of a first bale density of a forming bale at a first location in a baling chamber; receiving a second bale density signal from a second sensor of the baler, the second bale density signal being indicative of a second bale density of the forming bale at a second location in the baling chamber; receiving a windrow signal from a windrow sensor of the tow vehicle, the windrow signal being indicative of at least a width of a windrow in front of the tow vehicle; comparing the first bale density to the second bale density; determining a difference between the first bale density and the second bale density exceeds a threshold difference; and outputting a steering signal to a steering mechanism of the tow vehicle to adjust at least one steerable wheel of the tow vehicle by an adjustment when the determined difference exceeds the threshold difference, the adjustment being based at least partially on the received windrow signal.

One possible advantage that may be realized by exemplary embodiments disclosed herein is that the controller automatically causing the steering mechanism to adjust the steerable wheels reduces operator fatigue.

Another possible advantage that may be realized by exemplary embodiments disclosed herein is that the controller can be configured to control steering of the tow vehicle to follow a path that is non-sinusoidal and less prone to damaging components of the tow vehicle and/or baler.

Yet another possible advantage that may be realized by exemplary embodiments disclosed herein is that the controller can be configured to take into account a height and/or relative position of the windrow when outputting the steering signal to adjust the steerable wheels.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
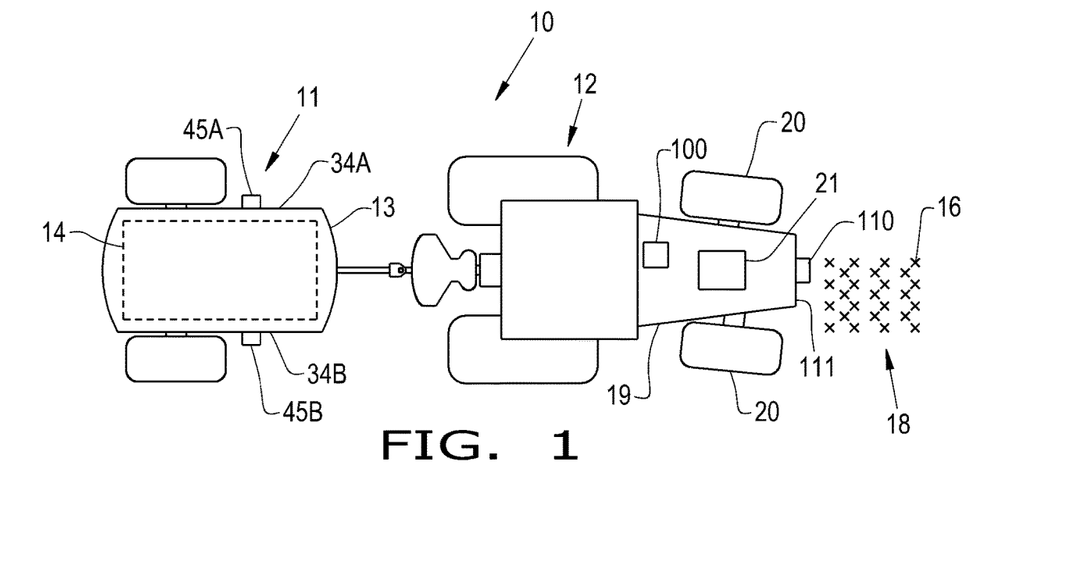
FIG. 1 illustrates a top view of an exemplary embodiment of an agricultural baling system including an agricultural baler and a tow vehicle towing the baler, provided in accordance with the present disclosure.

Referring now to FIG. 1, an exemplary embodiment of an agricultural baling system 10 is illustrated that includes a baler 11 towed by a tow vehicle 12, which is illustrated in the form of a tractor, toward crop material 16 that has been arranged into a windrow 18 on a field. The baler 11, which is illustrated in greater detail in FIG. 2, includes a baler chassis 13 that carries a baling chamber 14 and a pickup 15 with tines 17 configured to lift crop material from the ground and deliver it rearward to baling chamber 14. A detailed description of an exemplary baler 11 is set forth in U.S. Pat. No. 5,615,544, the entirety of which is incorporated by reference herein.

Tow vehicle 12 includes a vehicle chassis 19 and a plurality of steerable wheels 20 carried by the vehicle chassis 19. A steering mechanism 21 is coupled to the steerable wheels 20 and is configured to adjust at least one of the steerable wheels 20, as is known. An exemplary steering mechanism for steering the wheels is described by U.S. Pat. No. 8,234,033, the entirety of which is incorporated by reference herein.

Figure 2:
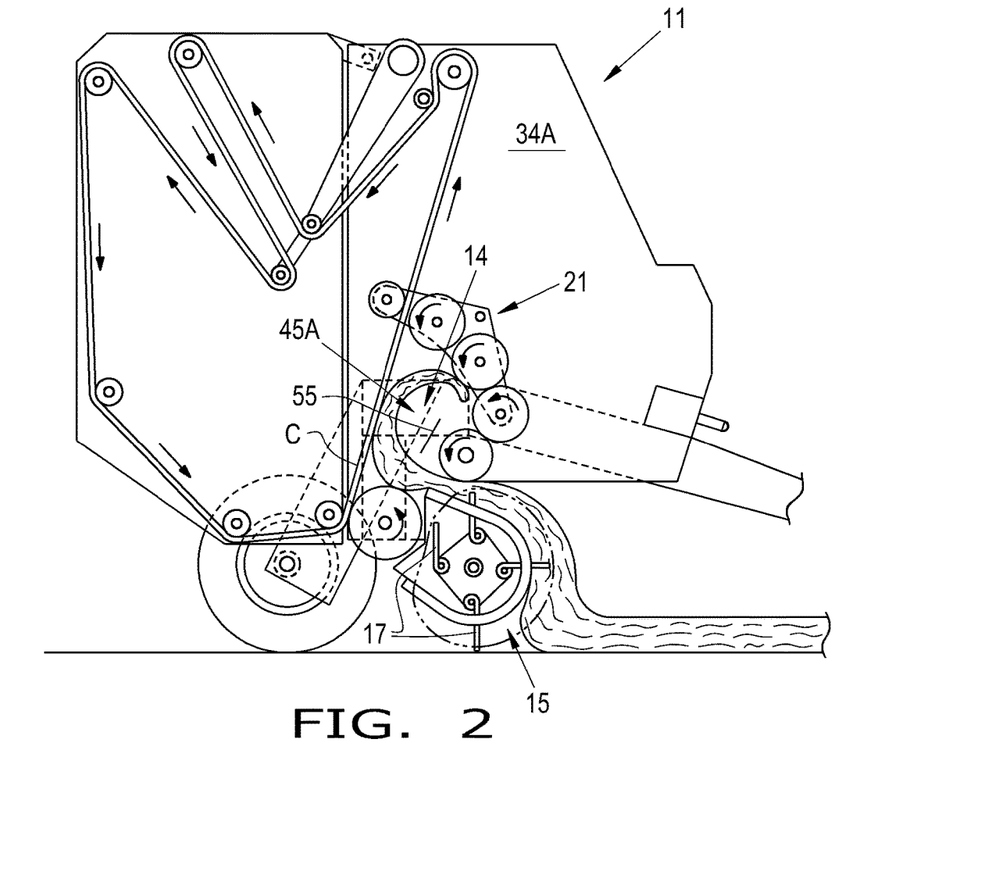
FIG. 2 illustrates a sectional view of the baler of FIG. 1, in accordance with an exemplary embodiment of the present disclosure.

A pair of sensors 45A, 45B are mounted on either side wall 34A, 34B of the baler 11, as illustrated in FIGS. 1 and 2, for measuring bale density. Although only two sensors are shown and described, it should be understood that multiple, e.g., left and right sensors, and in some embodiments, more than two sensors, e.g., a middle section sensor or sensors, may be utilized according to the present disclosure. In the two-sensor configuration, each sensor 45A, 45B may be separately mounted on the inside of an associated opposing side wall 34A, 34B of the baler 11. A paired arrangement of this nature is disclosed in U.S. Pat. No. 5,444,969, the entirety of which is hereby incorporated by reference.

Figure 3:
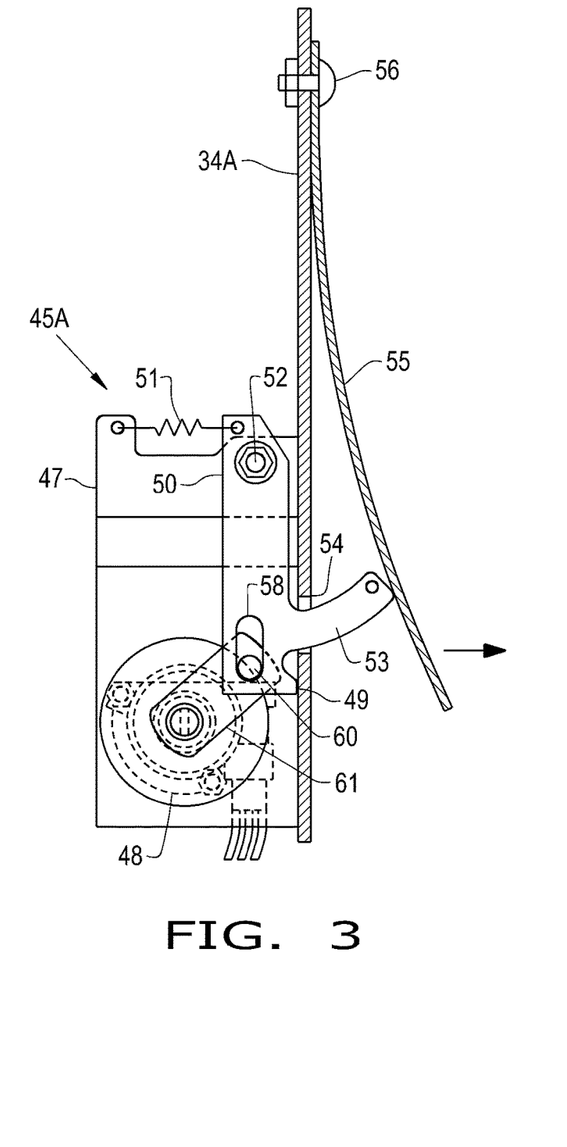
FIG. 3 illustrates an exemplary embodiment of a bale density sensor of the baler of FIGS. 1-2, the bale density sensor being in an extended position.
Figure 4:
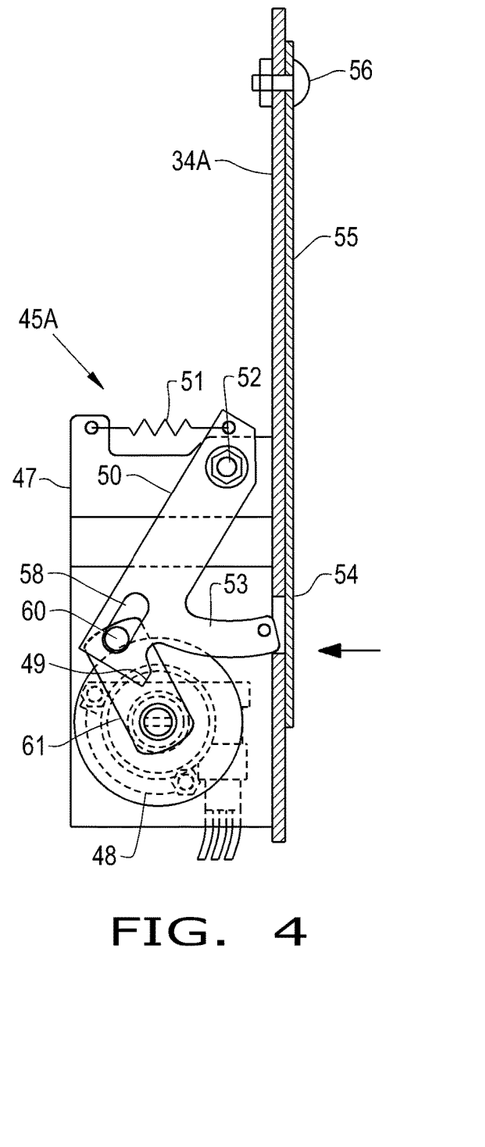
FIG. 4 illustrates the bale density sensor of FIG. 3 in a retracted position.

FIGS. 3 and 4 illustrate a sensor 45A mounted on side wall 34A, as shown in FIGS. 1-2. Another sensor 45B is similarly mounted on the opposing side wall 34B of the baler 11, in a paired arrangement as mentioned above. For the purposes of this description, only one of the sensors 45A, which may be referred to as a "first sensor," will be described in detail, but it should be appreciated that the sensor 45B mounted on opposing side wall 34B, which may be referred to as a "second sensor," may be configured and operate in a similar manner.

A mounting bracket 47 affixed to the outside of side wall 34A, 34B has mounted thereon a potentiometer 48 and a pivotally mounted sensor plate 50. A spring 51 engages the plate 50 to urge it in a counter-clockwise direction about a bolt 52, at which the plate 50 is pivotally mounted to bracket 47. The spring 51 under tension holds the plate 50 against the outside surface of the wall 34A, at a shoulder 49 in the empty chamber condition shown in FIG. 3. An integral finger portion 53 of the plate 50 extends through the wall 34A via an oval shaped aperture 54. The finger 53 is urged toward a leaf spring 55 (also illustrated in FIG. 2) secured to the inside of the side wall 34A by conventional fasteners such as bolts, nuts, screws, and other similar devices. The leaf spring 55 is preset in the position and shape shown in FIG. 3 under no load conditions. The spring 51 in such no load position provides force sufficient to maintain the shoulder 49 in contact with the wall 34A. Thus under conditions where there is no crop material in the vicinity of the sensor 45A in the baling chamber 14, the end of the finger portion 53 is in contact with the leaf spring 55 but applies no force or a negligible force against the leaf spring 55.

A slot 58 in the plate 50 accommodates an actuator rod 60 extending from a rocker arm 61. When the plate 50 pivots about the bolt 52, the rod 60 traverses the slot 58 and thereby moves the rocker arm 61 between the position shown in FIG. 3 and the position shown in FIG. 4, in which the position of the elements of the sensor 45A is shown under conditions where maximum crop compaction in a vicinity of the sensor assembly 45A is sensed.

The potentiometer 48 may be any commercially available potentiometer. An exemplary potentiometer 48 is manufactured by CTS Corporation, of Elkhart, Ind. The potentiometer 48 may be a sealed unit which enhances system integrity in the dust and debris laden environment under which the baler 11 typically operates. The potentiometer 48 is rotatable against a spring in a known manner. The potentiometer 48 is urged in a clockwise direction and thereby acts with the spring 51 to urge the rocker arm 61 in a counter-clockwise direction. The position of the potentiometer 48 is precisely maintained relative to the rocker arm 61 and accordingly, the leaf spring 55.

Referring specifically now to FIG. 2, in operation, as mentioned above, crop material is picked up by the pickup 15 and conveyed by the tines 17 to a floor roll which urges it against upwardly traveling course c of an apron. Initially, when the baling chamber 14 is empty, material begins to spiral in a clockwise direction until it engages the rollers of sledge assembly 21 which continue to coil it in a spiral fashion causing course c to expand until it reaches the full bale position. During such bale forming operation, crop material adjacent the side walls in the peripheral portion of the cylindrical package being formed is in continuous contact with the leaf spring 55 of opposing sensors 45A, 45B. More specifically, crop material traverses the leaf springs 55 in a longitudinal fashion along a generally spiral path from the upstream end to the downstream end. In this manner the degree of crop compaction is sensed as the preset bias is overcome and the leaf springs are urged toward the side walls 34A, 34B. The position of the potentiometer 48 of each sensor 45A, 45B will vary based on the position of its associated leaf spring 55, which moves toward or away from the respective side wall 34A, 34B in response to the force exerted by crop material passing thereover. This force is directly proportional to the degree of compactness, i.e., density, of the crop material of the forming bale at the respective location. The leaf springs 55 in turn move the associated control arms of the potentiometers 48, thereby varying the voltage potential in direct relationship to the density of the crop material at each respective location of the forming bale. Thus, as the cylindrical package of crop material increases in size, the comparative density of its ends can be monitored by the first sensor 45A outputting a first bale density signal that is indicative of a first bale density of the forming bale at a first location in the baling chamber 14 and by the second sensor 45B outputting a second bale density signal that is indicative of a second bale density of the forming bale at a second location in the baling chamber 14. It should be appreciated that while the sensors 45A, 45B are illustrated and described as including potentiometers 48 to output their respective bale density signal, sensors that use other ways to output bale density signals indicative of a density of the bale may be utilized according to the present disclosure.

In known agricultural baling systems, a display in an operator cab of the towing vehicle displays the different densities of the bale as sensed by the sensors 45A, 45B. The different densities may be displayed, for example, as varying numbers of bars. The density of the bale generally varies at the different locations during operation due to the width of the windrow being less than the width of the baling chamber. The operator may watch the bars and steer the tractor accordingly to balance the density of the forming bale at the different locations in the baling chamber to form a uniform bale with the desired shape. This constant attention to the display can fatigue the operator and distract the operator from performing other actions.

To address some of the previously described issues with known agricultural baling systems, and referring again to FIG. 1, a controller 100 is provided that is operatively coupled to the steering mechanism 21, the first sensor 45A, the second sensor 45B, and a windrow sensor 110. The controller 100 may be, for example, a baling system controller that controls various functions of the baler 11 and the tow vehicle 12. In some embodiments, the controller 100 is a tow vehicle controller that only controls various functions of the tow vehicle 12 but receives input from various elements of the baler 11. The windrow sensor 110 may be a sensor that is directed at a windrow 18 in front of the tow vehicle 12 and is configured to output a windrow signal that is indicative of at least a width of the windrow 18. The windrow sensor 110 may, for example, comprise an optical sensor that is placed at a front 111 of the tow vehicle 12. An exemplary windrow sensor 110 is disclosed by U.S. Patent Application Publication No. 2018/0325013, which is incorporated in its entirety herein by reference. It should be appreciated that the windrow signal output by the windrow sensor 110 may be indicative of more than just the width of the windrow 18, as will be described further herein.

Figure 5:
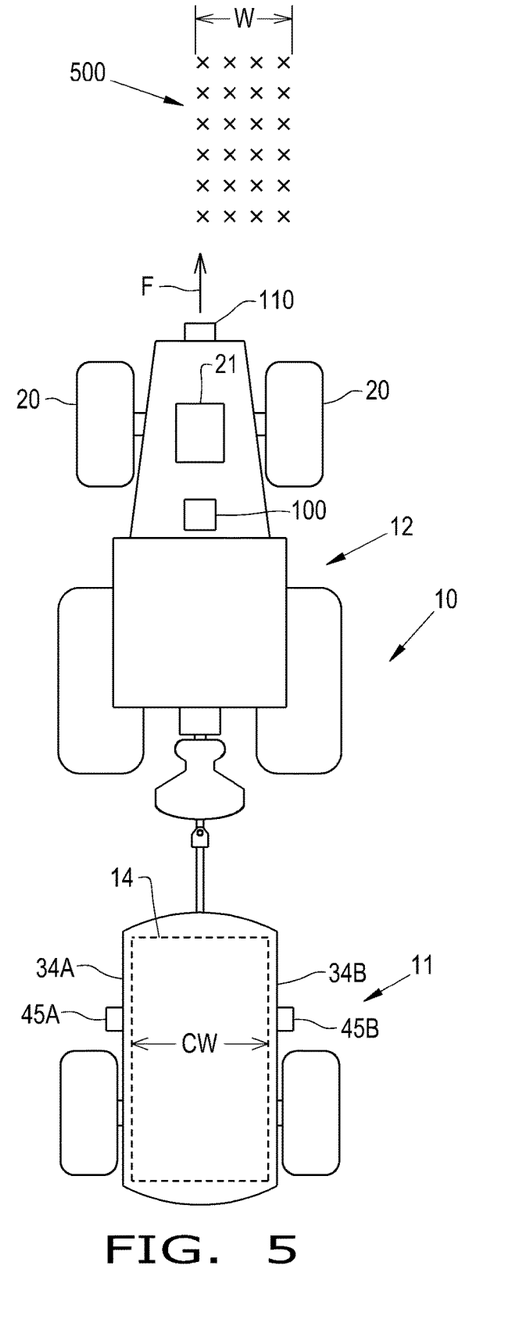
FIG. 5 is a schematic view of the agricultural baling system of FIGS. 1-4 forming a bale from crop material arranged in a windrow.

Referring now to FIG. 5, the agricultural baling system 10 is illustrated in a field forming a bale in the baling chamber 14 by adding crop material from a windrow 500 having a width W. As illustrated, the width W of the windrow 500 is less than a baling chamber width CW of the baling chamber 14 so the density of the forming bale inside the baling chamber 14 will vary at different locations in the baling chamber 14. The sensors 45A, 45B outputting their respective bale density signals to the controller 100 allows the controller 100 to monitor the density of the forming bale at the different locations in the baling chamber 14.

To balance the densities of the forming bale at the different locations in the baling chamber 14, the controller 100 is configured to receive the first bale density signal from the first bale sensor 45A and the second bale density signal from the second bale sensor 45B. From the received bale density signals, the controller 100 can determine the respective densities of the forming bale at each location associated with one of the respective sensors 45A, 45B. The controller 100 compares the first bale density to the second bale density and determines when a difference between the first bale density and the second bale density exceeds a threshold difference. The threshold difference may be, for example, when the larger of the first bale density and the second bale density is at least 20% greater than the smaller density.

When the difference between the first bale density and the second bale density exceeds the threshold difference, this indicates that the densities of the forming bale should be balanced. The controller 100 outputs a steering signal to the steering mechanism 21 to adjust at least one of the steerable wheels 20 by an adjustment when the determined difference exceeds the threshold difference. By outputting the steering signal to the steering mechanism 21 to adjust one or more steerable wheels 20, the controller 100 can adjust a travel path of the baling system 10 so crop material from the windrow 500 is added to a location of the forming bale where the density is less than the density at a different location of the forming bale.

Figure 6:
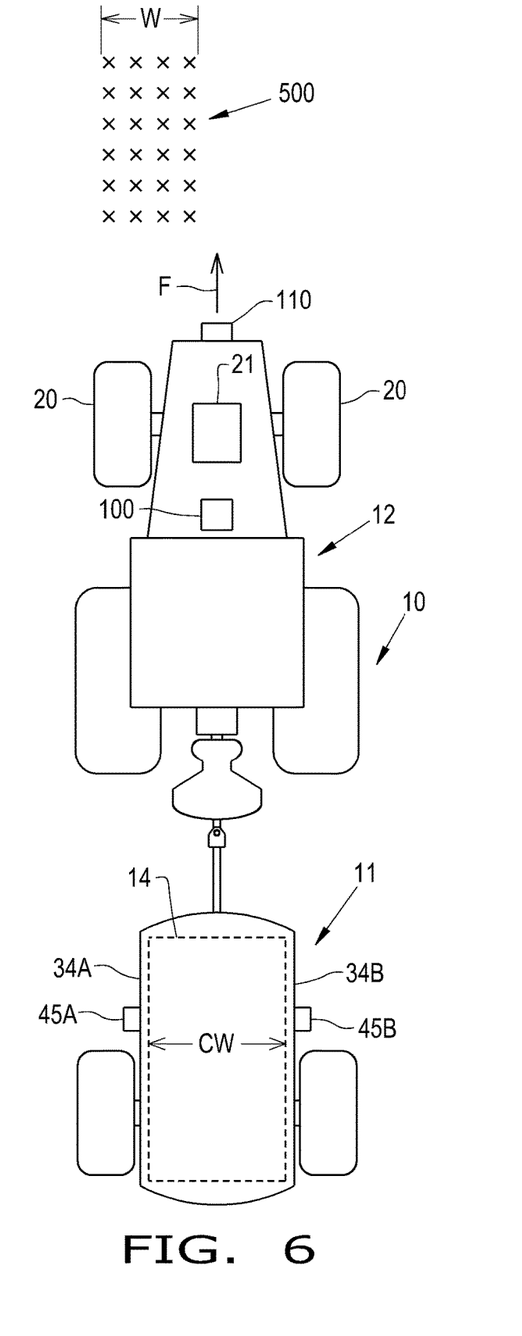
FIG. 6 is a schematic view of the agricultural baling system of FIGS. 1-5 after a controller has output a steering signal to a steering mechanism to turn the tractor and towed baler.

For example, when the controller 100 determines that the first bale density, which may correspond to a density of the forming bale on a left side of the baler 12 relative to a forward travel direction F, is less than the second bale density, the output steering signal can cause the steering mechanism 21 to adjust the steerable wheels 20 so the tow vehicle 11, and thus the towed baler 12, moves to the right, as illustrated in FIG. 6 compared to FIG. 5. Moving the baler 12 to the right causes the picked up crop material from the windrow 500 to be added to the left side of the forming bale in order to balance the density of the forming bale at different locations.

To identify the proper adjustment of the tow vehicle 12 needed to balance the bale densities, the controller 100 receives the windrow signal from the windrow sensor 110, which at least indicates the width W of the windrow 500. From the windrow signal, the controller 100 can determine, for example, a difference between the width W of the windrow 500 and the width CW of the baling chamber 14 to determine what the adjustment should be to adjust the travel path of the tow vehicle 12 and balance the densification of the forming bale. For example, the controller 100 can alter the steering signal output to the steering mechanism 21 based on the received windrow signal, which indicates the width W of the windrow 500, so the adjustment of the steerable wheel(s) 20 causes the baling chamber 14 to be carried along a path, relative to the windrow 500, where no crop material from the windrow 500 is added to the forming bale at the location where the bale density is higher, i.e., the higher density location of the forming bale is taken out of alignment with the windrow 500 so no further crop material is added to the forming bale at that location. Thus, the controller 100 is configured to output the steering signal to adjust one or more of the steerable wheels 20 by an adjustment that is based at least partially on the received windrow signal.

In some embodiments, the output windrow signal is further indicative of other characteristics of the windrow 500, such as a relative position of the windrow 500 in relation to the baling chamber 14, a height of the windrow 500, and/or a shape of the windrow 500. In some embodiments, the windrow signal is indicative of at least two of these characteristics, such as a height and a shape of the windrow 500. Upon receiving the windrow signal that is indicative of the width W, height, and shape of the windrow 500, the controller 100 can determine how crop material from the windrow 500 will flow into the baling chamber 14, and thus be added to the forming bale. Based on this information, the controller 100 can precisely determine what the adjustment should be to balance the density of the forming bale at the different locations, and output a corresponding steering signal to the steering mechanism 21 to cause such adjustment.

In some embodiments, the controller 100 is configured so the output steering signal causes the steering mechanism 21 to adjust at least one of the steerable wheels 20 so the tow vehicle 12 travels forward in a non-sinusoidal fashion. As used herein, the tow vehicle 12 travels forward in a "non-sinusoidal fashion" in the sense that the travel path of the tow vehicle 12 does not follow an entire period of a sine wave. For example, the output steering signal may cause an adjustment of the steerable wheels 20 so the tow vehicle 12, and thus the towed baler 11, travels forward along a path that resembles a square wave, as will be described further herein. It has been found that the tow vehicle 12 and the baler 11 traveling forward in a sinusoidal fashion can result in barrel shaped bales that have low density on the ends; traveling forward in a non-sinusoidal fashion can avoid the formation of such bale shapes.

Figure 7:
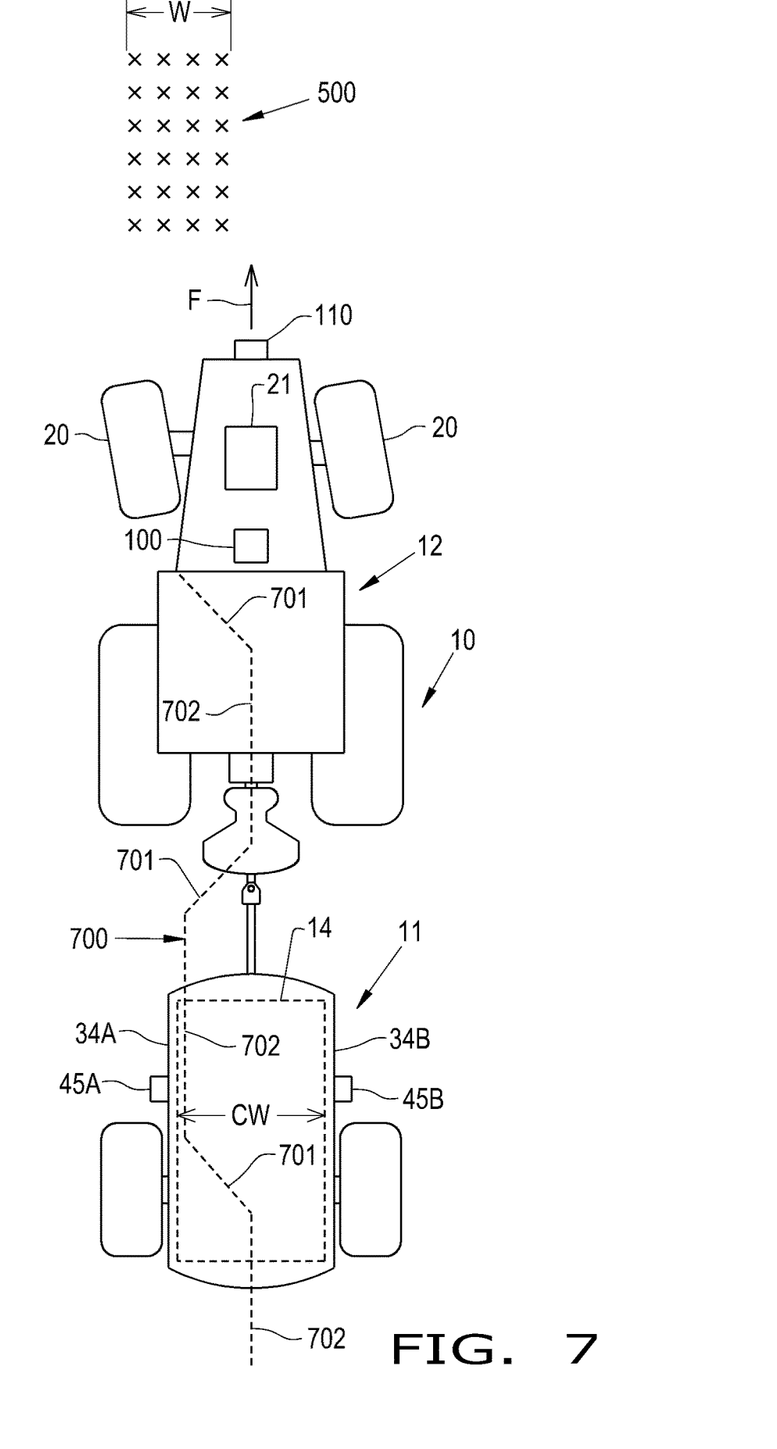
FIG. 7 is a schematic view of the agricultural baling system of FIGS. 1-6 after the controller has output an interval steering signal to the steering mechanism to turn the tractor and towed baler.

In some embodiments, the controller 100 is configured to output steering signals to the steering mechanism 21 so the baling system 10 follows a regular travel path until the controller 100 determines that the difference between the first bale density and the second bale density exceeds the threshold difference. Referring still to FIGS. 5-6, and referring now to FIG. 7 as well, the controller 100 can be configured to output an interval steering signal to the steering mechanism 21 to adjust at least one of the steerable wheels 20 after a set time period has elapsed since a last adjustment of the steerable wheels 20. For example, the controller 100 can be configured to output the interval steering signal to the steering mechanism 21 at a set time period of between 2 seconds and 6 seconds to adjust the steerable wheel(s) 20 and the travel path of the tow vehicle 12. The controller 100 can be configured so the output interval steering signal causes adjustments that alternate direction after every set time period, e.g., the controller 100 may output a first interval steering signal that causes the steering mechanism 21 to adjust the wheel(s) 20 to steer the tow vehicle 12 to the left followed by a second interval steering signal that causes the steering mechanism 21 to adjust the wheel(s) 20 to steer the tow vehicle 12 to the right after the set time period has elapsed. An exemplary travel path 700 is illustrated in FIG. 7 that has sloped turn cuts 701 between parallel path portions 702, with each parallel path portion 702 having a roughly equivalent length at a constant speed, but it should be appreciated that the illustrated travel path 700 is exemplary only and the controller 100 can be configured to control the steering mechanism 21 so the tow vehicle 12 follows other types of travel paths.

From the foregoing, it should be appreciated that the controller 100 of the agricultural baling system 10 controls the steering mechanism 21 to balance the bale density of the forming bale in the baling chamber 14. By at least partially basing the output steering signal on the received windrow signal, the controller 100 can output a steering signal that accounts for the amount of crop material entering the baling chamber 14 from the windrow 500 so the density of the forming bale is generally equal in different locations. This control allows bales to be formed that have relatively balanced density and can have, for example, square corners.

Figure 8:
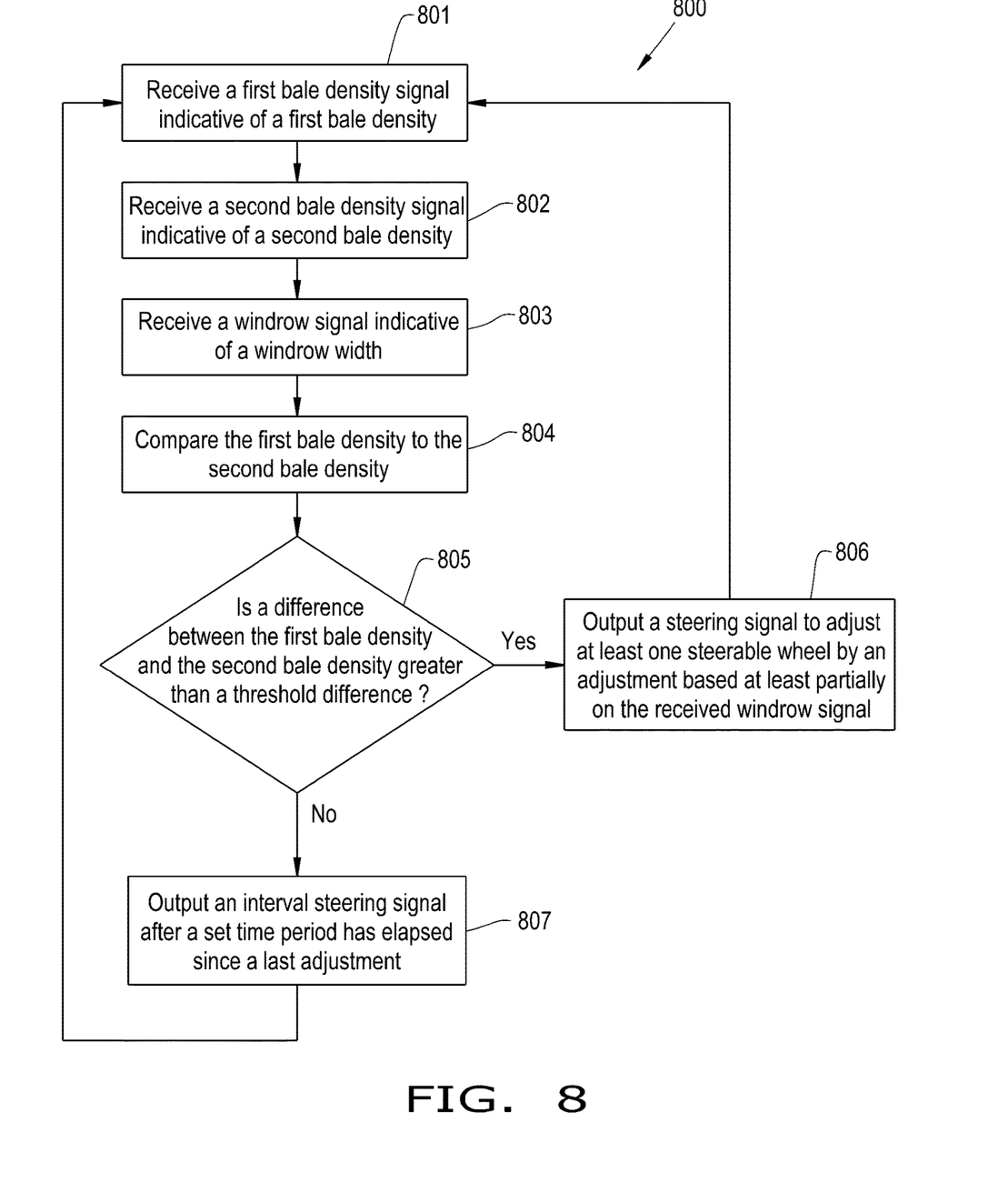
FIG. 8 is a flow chart illustrating an exemplary embodiment of a method of controlling a travel path of an agricultural baling system, provided in accordance with the present disclosure.

Referring now to FIG. 8, an exemplary embodiment of a method 800 provided according to the present disclosure is illustrated. The method 800 is for controlling a travel path 700 of an agricultural baling system 10 including a baler 11 and a tow vehicle 12 towing the baler 11. The method 800 is performed by a controller 100 and includes receiving 801 a first bale density signal from a first sensor 45A, the first bale density signal being indicative of a first bale density of a forming bale at a first location in a baling chamber 14, and receiving 802 a second bale density signal from a second sensor 45B, the second bale density signal being indicative of a second bale density of the forming bale at a second location in the baling chamber 14. The controller 100 also receives 803 a windrow signal from a windrow sensor 110 of the tow vehicle 12, the windrow signal being indicative of at least a width W of a windrow 500 in front of the tow vehicle 12. The controller 100 compares 804 the first bale density to the second bale density and determines 805 a difference between the first bale density and the second bale density exceeds a threshold difference. When the determined difference exceeds the threshold difference, the controller 100 outputs 806 a steering signal to a steering mechanism 21 of the tow vehicle 12 to adjust at least one steerable wheel 20 of the tow vehicle 12 by an adjustment. The adjustment is based at least partially on the received windrow signal.

In some embodiments, the output windrow signal is further indicative of a relative position, a height, and/or a shape of the windrow 500 in front of the tow vehicle 12. The windrow sensor 110 may be, for example, an optical sensor placed at a front of the tow vehicle 12; the first sensor 45A and/or the second sensor 45B may comprise a potentiometer 48, as previously described.

In some embodiments, the controller 100 outputs 807 an interval steering signal to the steering mechanism 21 to adjust at least one of the steerable wheels 20 after a set time period has elapsed since a last adjustment of the steerable wheels 20. The set time period may be between, for example, 3 seconds and 10 seconds. Further, the interval steering signal may cause the steering mechanism 21 to adjust at least one steerable wheel 20 so the tow vehicle 12 travels forward in a non-sinusoidal fashion, as previously described. In some embodiments, the controller 100 loops outputting 807 the interval steering signal after the set time period to keep the tow vehicle 12 and baler 11 turning at regular intervals, with the controller 100 only outputting 806 the previously described steering signal when the difference between the first bale density and the second bale density exceeds the threshold difference.

It is to be understood that the steps of the methods 800 are performed by the controller 100 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 100 described herein, such as the method 800, is implemented in software code or instructions which are tangibly stored on a tangible computer readable medium, such as a memory of the controller 100. The controller 100 loads the software code or instructions via a direct interface with the computer readable medium or via a wired and/or wireless network. Upon loading and executing such software code or instructions by the controller 100, the controller 100 may perform any of the functionality of the controller 100 described herein, including any steps of the method 800 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural baling system, comprising:
   an agricultural baler comprising:
      a baler chassis;
      a pickup carried by the baler chassis and comprising a plurality of tines;
      a baling chamber carried by the baler chassis;
      a first sensor configured to output a first bale density signal indicative of a first bale density of a forming bale at a first location in the baling chamber; and
      a second sensor configured to output a second bale density signal indicative of a second bale density of the forming bale at a second location in the baling chamber; and
   a tow vehicle coupled to the agricultural baler, the tow vehicle comprising:
      a vehicle chassis;
      a plurality of steerable wheels carried by the vehicle chassis;
      a steering mechanism coupled to the steerable wheels and configured to adjust at least one of the steerable wheels;
      a windrow sensor carried by the vehicle chassis and configured to output a windrow signal indicative of at least a width of a windrow in front of the tow vehicle; and
      a controller operably coupled to the first sensor, the second sensor, the steering mechanism, and the windrow sensor, the controller being configured to:
         receive the first bale density signal, the second bale density signal, and the windrow signal;
         compare the first bale density to the second bale density;
         determine a difference between the first bale density and the second bale density exceeds a threshold difference; and
         output a steering signal to the steering mechanism to adjust at least one of the steerable wheels by an adjustment when the determined difference exceeds the threshold difference, the adjustment being based at least partially on the received windrow signal.

2. The baling system of claim 1, wherein the output windrow signal is further indicative of at least one of a relative position, a height, or a shape of the windrow in front of the tow vehicle.

3. The baling system of claim 1, wherein the controller is further configured to output an interval steering signal to the steering mechanism to adjust at least one of the steerable wheels after a set time period has elapsed since a last adjustment of the steerable wheels.

4. The baling system of claim 3, wherein the set time period is between 2 seconds and 6 seconds.

5. The baling system of claim 1, wherein the steering signal causes the steering mechanism to adjust at least one of the steerable wheels so the tow vehicle travels forward in a non-sinusoidal fashion.

6. The baling system of claim 1, wherein the threshold difference is at least 20% of the larger of the first bale density and the second bale density.

7. The baling system of claim 1, wherein at least one of the first sensor or the second sensor comprises a potentiometer disposed in the baling chamber.

8. The baling system of claim 1, wherein the windrow sensor comprises an optical sensor placed at a front of the tow vehicle.

9. A method of controlling a travel path of an agricultural baling system comprising a baler and a tow vehicle towing the baler, the method being performed by a controller and comprising:
   receiving a first bale density signal from a first sensor of the baler, the first bale density signal being indicative of a first bale density of a forming bale at a first location in a baling chamber;
   receiving a second bale density signal from a second sensor of the baler, the second bale density signal being indicative of a second bale density of the forming bale at a second location in the baling chamber;
   receiving a windrow signal from a windrow sensor of the vehicle, the windrow signal being indicative of at least a width of a windrow in front of the tow vehicle;
   comparing the first bale density to the second bale density;
   determining a difference between the first bale density and the second bale density exceeds a threshold difference; and
   outputting a steering signal to a steering mechanism of the tow vehicle to adjust at least one steerable wheel of the tow vehicle by an adjustment when the determined difference exceeds the threshold difference, the adjustment being based at least partially on the received windrow signal.

10. The method of claim 9, wherein the output windrow signal is further indicative of at least one of a relative position, a height, or a shape of the windrow in front of the tow vehicle.

11. The method of claim 9, further comprising outputting an interval steering signal to the steering mechanism to adjust at least one of the steerable wheels after a set time period has elapsed since a last adjustment of the steerable wheels.

12. The method of claim 11, wherein the set time period is between 3 seconds and 10 seconds.

13. The method of claim 9, wherein the steering signal causes the steering mechanism to adjust at least one steerable wheel of the tow vehicle so the tow vehicle travels forward in a non-sinusoidal fashion.

14. The method of claim 9, wherein the threshold difference is at least 20% of the larger of the first bale density and the second bale density.

15. The method of claim 9, wherein at least one of the first sensor or the second sensor comprises a potentiometer disposed in the baling chamber.

16. The method of claim 9, wherein the windrow sensor comprises an optical sensor placed at a front of the tow vehicle.

* * * * *